United States Patent
Kaiser et al.

(10) Patent No.: US 10,240,069 B2
(45) Date of Patent: Mar. 26, 2019

(54) ANTI-CORROSION COMPOSITION COMPRISING AT LEAST ONE FIRST COMPOUND AND AT LEAST ONE SECOND COMPOUND

(71) Applicant: DENSO-HOLDING GMBH & CO, Leverkusen (DE)

(72) Inventors: Thomas Markus Kaiser, Inden (DE); Oleg Gryshchuk, Leverkusen (DE)

(73) Assignee: Denso-Holding GmbH & Co., Leverkusen (DE)

( * ) Notice: Subject to any disclaimer, the term of this patent is extended or adjusted under 35 U.S.C. 154(b) by 0 days.

(21) Appl. No.: 15/746,604

(22) PCT Filed: Nov. 15, 2016

(86) PCT No.: PCT/EP2016/077763
§ 371 (c)(1),
(2) Date: Jan. 22, 2018

(87) PCT Pub. No.: WO2017/085074
PCT Pub. Date: May 26, 2017

(65) Prior Publication Data
US 2019/0002738 A1    Jan. 3, 2019

(30) Foreign Application Priority Data

Nov. 16, 2015   (DE) .................. 10 2015 119 790

(51) Int. Cl.

| | |
|---|---|
| *C09J 9/00* | (2006.01) |
| *B32B 7/14* | (2006.01) |
| *B32B 1/08* | (2006.01) |
| *B32B 25/16* | (2006.01) |
| *B32B 25/02* | (2006.01) |
| *B32B 25/08* | (2006.01) |
| *B32B 15/06* | (2006.01) |
| *B32B 15/18* | (2006.01) |
| *C09J 7/30* | (2018.01) |

(52) U.S. Cl.
CPC .................. *C09J 9/00* (2013.01); *B32B 1/08* (2013.01); *B32B 7/14* (2013.01); *B32B 15/06* (2013.01); *B32B 15/18* (2013.01); *B32B 25/02* (2013.01); *B32B 25/08* (2013.01); *B32B 25/16* (2013.01); *C09J 7/30* (2018.01); *B32B 2250/24* (2013.01); *B32B 2270/00* (2013.01); *B32B 2307/50* (2013.01); *B32B 2307/714* (2013.01); *B32B 2597/00* (2013.01); *C09J 2409/00* (2013.01); *C09J 2423/00* (2013.01)

(58) Field of Classification Search
CPC .. C09J 9/00; C09J 7/30; C09J 2409/00; B32B 7/14; B32B 1/08; B32B 25/16; B32B 25/02; B32B 25/08; B32B 15/06; B32B 15/18; B32B 2307/50; B32B 2250/24; B32B 2270/00; B32B 2307/714; B32B 2597/00
See application file for complete search history.

(56) References Cited

U.S. PATENT DOCUMENTS

| | | | |
|---|---|---|---|
| 2014/0318686 | A1 | 10/2014 | Nooren |
| 2015/0259805 | A1* | 9/2015 | Nooren et al. ........... C09D 5/08 428/446 |

FOREIGN PATENT DOCUMENTS

| | | |
|---|---|---|
| EP | 0244738 A2 | 11/1987 |
| EP | 2210734 A2 | 7/2010 |
| WO | 2016/165791 A1 | 10/2016 |

OTHER PUBLICATIONS

T.G. Fox, Jr. and P.J. Flory, Intrinsic Viscosity-Temperature Relationships for Polyisobutylene in Various Solvents, May 1951, pp. 1901-1915 [Contribution from the Dept. of Chemistry, Cornell Univ.].
Search Report for PCT/EP2016/077763, dated Feb. 20, 2017.

* cited by examiner

*Primary Examiner* — Nathan M Nutter
(74) *Attorney, Agent, or Firm* — Dinsmore & Shohl LLP

(57) ABSTRACT

An anti-corrosion composition includes a first compound including: a first polyisobutylene having an average relative molar mass ranging from about 30,000 to about 100,000 g/mole and a Staudinger index ranging from about 15-70 cm$^3$/g, a first depolymerized butyl rubber with Brookfield viscosity at 66° C. ranging from about 400,000-2,000,000 mPa·s and an average molecular weight ranging from about 20,000-60,000, and combinations thereof. A second compound includes a second polyisobutylene having an average relative molar mass ranging from about 900,000-6,500,000 g/mole and a Staudinger index ranging from about 240-900 cm$^3$/g, at least one second partly cross-linked butyl rubber with a Mooney viscosity at 127° C. ranging from about 65-100 MU. The anti-corrosion composition includes at least one first or at least one second polyisobutylene as well as at least one first or at least one second butyl rubber.

14 Claims, No Drawings

ANTI-CORROSION COMPOSITION COMPRISING AT LEAST ONE FIRST COMPOUND AND AT LEAST ONE SECOND COMPOUND

CROSS-REFERENCE TO RELATED APPLICATIONS

This application is the U.S. national stage of PCT/EP2016/077763, filed Nov. 15, 2016, which claims priority of DE 102015119790.1, filed Nov. 16, 2015.

TECHNICAL FIELD

The present invention relates to an anti-corrosion composition comprising at least a first compound and at least a second compound and their use for protecting pipes and systems comprising pipes as well as other plants and installations, as well as to a method for achieving corrosion protection, and to an at least single-layered wrapping tape comprising the composition according to the invention.

BACKGROUND

Anti-corrosion compositions and anti-corrosion systems used for example for pipe plants such as pipelines, but also for other technical plants, are widely known from the prior art. EP 0 421 607 A1 for example discloses a tape wrap system for protecting tubular articles comprising an innerwrap covering the surface of the article to be protected and an outerwrap placed over said innerwrap, said innerwrap comprising an impact-resistant layer carrying an adhesive layer on its inner surface and a layer on its outer surface, and said outerwrap comprising a carrying layer having a layer on at least one of its surfaces, said innerwrap and outerwrap including a heat fusable material, and said tape wrap system is applied to the tubular article in a way that said outerwrap heat fuses together with said innerwrap when heated and thereafter cooled, thus forming a completely closed protective coating. The object of the tape wrap system disclosed above is to provide a continuous, seamless, protective tape wrap system in order to improve resistability against destructive external forces. one of the adhesive layers can for example be made of butyl rubber. As heat fusable material for example ethylene vinyl acetate, ethylene methyl acrylate and polyethylene of low density are used. The problem of the tape wrap system disclosed in EP 0 421 607 A1 is in case of wrapped pipe systems and technical plants of each kind especially at higher temperatures the contact between for example the outer surface of a pipeline tube and the adhesive layer, for example of butyl rubber, which might loosen from the outer surface of the pipeline tube.

Corresponding problems do also occur, if anti-corrosion compositions are not used in a tape format but for example as a spattling compound. Here, especially at high temperatures, a sufficient adhesion between the spattling compound and for example steel surfaces is not given either. The adhesion of materials is in particular characterized as peel strength, also referred to as peel resistance and can be determined according to DIN 112068 in the version of 1999-03. However, not only at high temperatures, but often also at room temperatures (20° C. or 23° C.) the above-mentioned adhesion is improvable. Therefore, in prior art, an improved adhesion is often achieved by using a primer/adhesive containing solvents.

SUMMARY

The object of the present invention is therefore to provide an anti-corrosion composition which offers an improved adhesion on surfaces of each kind, for example pipes or systems comprising pipes including pipelines, as well as other installations, and which preferably furthermore provides an improved mechanical strength.

DETAILED DESCRIPTION OF PREFERRED EMBODIMENTS

This object is achieved by an anti-corrosion composition comprising at least a first compound selected from a group comprising at least a first polyisobutylene with an average relative molar mass $\overline{M}_V$ ranging from about 14,000 g/mole, preferred to about 30,000 g/mole, to about 150,000 g/mole, preferred to about 100,000 g/mole and a Staudinger-Index $J_0$ ranging from about 15 cm$^3$/g to about 70 cm$^3$/g and/or at least a first depolymerized butyl rubber with an apparent Brookfield viscosity at 66° C. according to DIN EN ISO 2555:2000-01 ranging from about 400,000 mPa·s to about 2,000,000 mPa·s and an average molecular weight $M_w$ ranging from about 20,000 to about 60,000, and at least a second compound, selected from a group comprising at least a second polyisobutylene having an average relative molar mass $\overline{M}_V$ ranging from about 900,000 g/mole, preferred from about 950,000 g/mole, to about 7,500,000 g/mole, preferred to about 6,500.000 g/mole, and a Staudinger-Index $J_0$ ranging from about 240 cm$^3$/g to about 900 cm$^3$/g and/or at least a second partly cross-linked butyl rubber with a Mooney viscosity ML(1+3) at 127° C. ranging from about 65 MU to about 100 MU according to ISO 289:2005, wherein the anti-corrosion composition comprises at least one first or at least one second polyisobutylene as well as at least one first or at least one second butyl rubber.

Formerly, the Staudinger-Index $J_0$ was also referred to as Intrinsic Viscosity. It is calculated from the flow time at 20° C. through a capillary of an Ubbelohde viscometer according to the following formula (Schulz-Blaschke equation):

$$J_0 = \eta_{sp}/c(1+0.31 \times \eta_{sp}) \text{ cm}^3/\text{g}$$

wherein $$\eta_{sp} = \frac{t}{t_o} - 1 \text{ (specific viscosity)},$$

wherein t indicates the flow time of the solution with a Hagenbach-Couette correction, $t_0$ and c indicates the concentration of the solution in g/cm3. Die average relative molar mass $\overline{M}_V$ (viscosity agent) is calculated from the following formula:

$$0.65\sqrt{\frac{J_0 \times 10^2}{3.06}}$$

Polyisobutylenes according to the present invention are preferably synthesized via a cationic polymerisation of isobutene (2-methylpropene) at a temperature ranging from about −100° C. to about 0° C. The temperature influences the molar mass of polyisobutylenes produced in this way, so that the lower the temperature the higher is the molar mass of the same. Usually, boron trifluoride or aluminiumtrichloride are used in an aqueous or alcoholic solution as initiators.

Said at least one first polyisobutylene preferably has a Staudinger-Index $J_0$ ranging from about 22 cm3/g to about 65 cm3/g, and even further preferred a Staudinger-Index $J_0$ ranging from about 25 cm3/g to about 45 cm3/g. Preferred, said at least one first polyisobutylene has an average relative molar mass $\overline{M}_v$ (viscosity agent) ranging from about 24,000 g/mole, preferred from about 35,000 g/mole to about 130,000 g/mole, preferred to about 95,000 g/mole and further preferred an average relative molar mass $\overline{M}_v$ ranging from about 30,000 g/mole, preferred from about 37,000 g/mole to about 75,000 g/mole, preferred to about 70,000 g/mole. The at least one first polyisobutylene is preferably comprised in a quantity of in a quantity ranging from about 28% by weight to about 60% by weight, further preferred in a quantity ranging from about 33% by weight to about 50% by weight, each based on the total quantity of the composition.

Said at least one second polyisobutylene preferably has a Staudinger-Index $J_0$ ranging from about 400 cm$^3$/g to about 800 cm$^3$/g and even further preferred a Staudinger-Index $J_0$ ranging from about 500 cm$^3$/g to about 700 cm$^3$/g. Preferred, the at least one second polyisobutylene has an average relative molar mass $\overline{M}_v$ ranging from about 1,500,000 g/mole, preferred from about 2,000,000 g/mole, to about 6,000,000 g/mole, preferred to about 5,000,000 g/mole, further preferred ranging from about 3,000,000 g/mole to about 5,000,000 g/mole, preferred to about 4,800,000 g/mole.

The term butyl rubber in the sense of the present invention is especially referred to as co- or block co-polymers of isobutene with about 0.5% by weight to about 5% by weight of isoprene, based on the total quantity of said butyl rubber, which are in particular produced by cationic polymerization. Via the used isoprene and the carbon-carbon double bonds contained in it and acting as functional groups, a cross-linking reaction can be initiated. In the sense of the present invention, the term butyl rubber comprises in particular also halogenized butyl rubbers, especially such being chlorinated respectively brominated (chlorobutyl rubber respectively bromobutyl rubber). Mixtures of various butyl rubbers can also be used, which means more than at least one butyl rubber.

Said at least one first depolymerized butyl rubber is received by depolymerization of butyl rubbers (IIR). Said at least one first butyl rubber has a low molecular weight. It is especially preferred at 23° C. in liquid form. Comparatively, said at least one second butyl rubber is not depolymerized and has other than said first butyl rubber a high molecular weight. Said at least one second butyl rubber is advantageously at 23° C. provided in a solid form.

Said at least one first depolymerized butyl rubber has an apparent Brookfield viscosity according to DIN EN ISO 2555:2000-01 at 66° C. ranging from about 600,000 mPa·s to about 1,600,000 mPa·s, further preferred ranging from about 700,000 mPA·s to about 1,500,000 mPA·s. Preferably, said at least one first depolymerized butyl rubber has an average molecular weight $M_w$ ranging from about 20,000 to about 60,000. Said at least one first depolymerized butyl rubber preferably has already at low temperatures, in particular at room temperatures of for example 20° C. or 23° C., or even at slightly higher temperatures for example of 40° C. to 50° C., the property of undergoing a cross-linking reaction due to the unsaturated carboncarbon double bonds contained in it.

Said at least one second partly cross-linked (in the following also referred to as partly pre-crosslinked) butyl rubber, having thus a lower proportion of unsaturated bonds than usual butyl rubbers, preferably has a Mooney viscosity ML (1+3) at 127° C. ranging from about 70 MU to about 93 MU, further preferred ranging from about 78 MU to about 91 MU, measured according to ISO 289:2005 or according to ASTM 1604-04. The specific density of said at least one second partly cross-linked butyl rubber is preferably at a temperature of 25° C. according to ASTM D1875 in the version of 2003 ranging from 0.5 to 1.1, preferred ranging from about 0.9 to about 0.98.

Preferred, said first compound is comprised by the composition according to the invention in a quantity ranging from about 20% by weight to about 66% by weight, preferred in a quantity ranging from about 28% by weight to about 60% by weight, further preferred in a quantity ranging from about 33% by weight to about 50% by weight, each based on the total quantity of the composition. Especially preferred, said first compound is selected from a group exclusively comprising at least one first polyisobutylene, preferred one first polyisobutylene. In an alternative embodiment, said first compound is selected from a group exclusively comprising at least one first depolymerized butyl rubber, preferred exactly one first depolymerized butyl rubber. In a further alternative embodiment of the present invention, said first compound is a mixture of at least one first polyisobutylene and at least one first depolymerized butyl rubber, preferred a mixture of exactly one first polyisobutylene and exactly one first depolymerized butyl rubber. As far as a mixture of at least one first polyisobutylene and at least one first depolymerized butyl rubber is provided, preferred said at least one first polyisobutylene and said at least one first depolymerized butyl rubber are contained in an approximately same quantity in said composition. However, it may also be provided that a larger quantity of said at least one first polyisobutylene compared to said at least one first depolymerized butyl rubber is contained in it and vice versa.

Especially preferred, the second compound is comprised by said composition in a quantity ranging from about 1% by weight to about 20% by weight, further preferred in a quantity ranging from about 2% by weight to about 10% by weight, even further preferred in a quantity ranging from about 3% by weight to about 8% by weight, each based on the total quantity of said composition. Said second compound is in a first embodiment preferably selected from a group exclusively comprising at least one second polyisobutylene, preferred exactly one second polyisobutylene. In an alternative embodiment, the compound is selected from a group exclusively comprising at least one second partly cross-linked butyl rubber, preferred exactly one second partly cross-linked butyl rubber. In a further alternative embodiment, said second compound is selected from a mixture of at least one second polyisobutylene and at least one second partly cross-linked butyl rubber, preferred, a mixture of exactly one second polyisobutylene and one second partly cross-linked butyl rubber. As far as a mixture of at least one second polyisobutylene and at least one second, partly cross-linked butyl rubber is provided, in a preferred embodiment said at least one second polyisobutylene and said at least one second partly cross-linked butyl rubber can be comprised in said composition in approximately the same quantity. In a further embodiment however, varying quantities of said at least one second polyisobutylene and said at least one second partly cross-linked butyl rubber may also be comprised.

The ratio between said at least one first compound and said at least one second compound in the composition according to the invention is preferably ranging from about 15:1 to about 1:1, further preferred ranging from about 13:1 to about 5:1.

The higher the amount of said at least one second compound is in the composition according to the invention, the higher is in general the peel strength/the peel resistance. This is however accompanied by the disadvantage, that in a peel test, in case of high quantities of said at least one second compound, a rather adhesive and thus sustainable separation image is obtained.

The composition according to the invention preferably provides good values for the peel resistance and thus a good adhesion of the inventive anti-corrosion composition for example to steel surfaces of pipes or the like and at the same time a required cohesive separating image. Compared to a cohesive separation, an adhesive separation or an adhesive separation image which would be received between an anti-corrosion composition and the material covering it, as for example on a steel pipe, would be disadvantageous. In case of a cohesive separation or a cohesive separation image, when detaching the anti-corrosion composition from the protected product, it remains on the covered product at least in parts, as for example on a steel pipe. A mixture of at least one first and at least one second polyisobutylene moreover preferably provides an anti-corrosion composition which is not only sufficiently pourable to be used as a spattling compound, but also for example as a tape or pad, for example in wrapping tapes.

The anti-corrosion composition according to the invention does apart from said at least one first and said at least one second compound, preferably not provide any plasticizer, in particular no plasticizer in the form of a process oil. The use of such plasticizer can be spared as said at least one first compound is provided in a rather liquid and not too viscous form due to its relatively low molecular weight, which makes the use of plasticizers unnecessary. However, according to the invention, the use of a plasticizer, especially in the form of a process oil can be provided. As far as provided, the anti-corrosion composition according to the invention can comprise at least one process oil as a plasticizer, preferred in a quantity ranging from about 0.5% by weight to about 10% by weight, further preferred in a quantity ranging from about 2% by weight to about 8% by weight, each based on the total quantity of the composition according to the invention.

The anti-corrosion composition bears the advantage that it shows good values for the peel strength/peel resistance according to DIN 10268 in the version 1999-03 already at room temperatures of for example 23° C., in particular values being higher than about 5 N/cm, even further preferred higher than about 10 N/cm, while preferred are the values for the peel strength/peel resistance according to DIN EN 10268 in the version 1999-03 ranging from about 6 N/cm to about 20 N/cm, even further preferred from about 10 N/cm to about 40 N/cm. The aforementioned values are based on the mechanical peel testing according to the DIN EN 10268 in the version 1999-03, and are exactly based on either applying the anti-corrosion composition onto a factory coating of for example a pipe lide a gas pipeline or pipeline, as well as based on an outer pipe surface which is not coated as for example a steel pipe.

Due to its good values for the peel strength respectively the peel resistance, the anti-corrosion composition according to the invention has a high mechanical strength. This also applies in case of higher temperatures. The anti-corrosion composition according to the invention preferably also has a good adhesion to substrates of each kind, in particular to pipes such as pipelines or systems comprising pipes, equally whether they have already been provided with a factory coating or not, which means in the last case having a metal surface, in particular a steel surface for applying said anti-corrosion composition. Especially advantageous is that it is possible to apply the anti-corrosion composition without previously applying a primer/adhesive agent, which means that the work and time consuming pretreatment with these products can be omitted. However, according to the invention, the use of a primer or adhesive agent is not to be excluded. Suitable products are for example made of butyl rubber in mixtures with hydrocarbon resins and petrol as a solvent, which can for example be obtained under the name DENS OLEN Primer, at DENSO GmbH, Leverkusen, Germany.

Preferred, the anti-corrosion composition according to the invention comprises at least a third compound, selected from a group comprising at least a third polyisobutylene with a Staudinger index $J_0$ ranging from about 75 cm$^3$/g to about 235 cm$^3$/g and with an average relative molar mass $\overline{M}_V$ ranging from about 150,000 g/mole, preferred from about 160,000 g/mole, to about 950,000 g/mole, preferred to about 850,000 g/mole and/or at least a third butyl rubber with an average molecular weight $M_w$ ranging from about 150,000 to about 2,000,000 and a Mooney viscosity ML(1+8) at 125° C. ranging from about 20 MU to about 62 MU, measured according to ISO 289:2005.

Said at least one third polyisobutylene preferably has a Staudinger index $J_0$ ranging from about 106 cm$^3$/g to about 160 cm$^3$/g. Preferred, said at least one second polyisobutylene has an average relative molar mass $\overline{M}_V$ ranging from about 250,000 g/mole to about 600,000 g/mole, preferred to about 550,000 g/mole. Preferred, said at least one second polyisobutylene is comprised in a quantity ranging from about 10% by weight to about 35% by weight, further preferred in a quantity ranging from about 13% by weight to about 28% by weight, each based on the total quantity of the composition.

The ratio between said at least one first polyisobutylene, i.e. the total quantity of said used first polyisobutylene, even if it is a mixture, and said at least one second polyisobutylene, i.e. the total quantity of said second polyisobutylene, even if it is a mixture, is preferably ranging from about 2.5:1 to about 1:2.5, further preferred ranging from about 2.2:1 to about 1:1.

The polyisobutylenes used according to the invention, i.e. the first, the second as well as the third polyisobutylene, preferably have a glass transition temperature Tg, (measured calorimetrically by DSC) of below −50° C., further preferred below −58° C. Especially preferred, the glass transition temperature of said at least one first, of said at least one second and of said at least one third polyisobutylene is ranging from about −55° C. to about −68° C., further preferred ranging from about −58° C. to about −68° C., further preferred ranging from about −58° C. to about −66° C. Said higher molecular, at least one second polyisobutylene can thus still be regarded as a highly viscous liquid and shows a certain creep tendency.

Said at least one third butyl rubber preferably has an average molecular weight $M_w$ ranging from about 200,000 to about 1,800,000, further preferred ranging from about 250,000 to about 600,000. Preferred, said at least one third butyl rubber has a Mooney viscosity ML(1+8) at 125° C. ranging from about 30 MU to about 60 MU, further preferred ranging from about 40 MU to about 59 MU, even further preferred ranging from about 40 MU to about 55 MU, measured according to ISO 289:2005. Said at least one third butyl rubber is preferably comprised by the composition in a quantity ranging from about 10% per weight to about 50% per weight, further preferred in a quantity ranging from about 15% by weight to about 35% by weight, each based on the total quantity of the composition.

Preferably, said at least one third butyl rubber comprises volumes of unsaturation ranging from about 1 mole-% to about 3 mole-%, further preferred ranging from about 1.3 mole-% to about 2.5 mole-%. This means that preferred, 1 mole-% to about 3 mole-%, further preferred about 1.3 mole-% to about 2.5 mole-% of unsaturated compounds, i.e. carbon-carbon double bonds as functional groups in the at least third butyl rubber are comprised. Especially preferred, said at least one third butyl rubber is produced by co-polymerization of isobutene and isoprene in methyl chloride as a solvent. The unsaturation (the degree of unsaturation) of the at least one third butyl rubber can also be at about 1.5 mole-%, especially at 1.5±0.5 mole-%.

In an especially preferred embodiment, said at least one third compound is comprised by the composition in a quantity ranging from about 10% by weight to about 40% by weight, preferred ranging from about 15% by weight to about 35% by weight, further preferred in a quantity ranging from about 16% by weight to about 30% by weight, each based on the total quantity of the composition. Said at least one third compound can be selected in an embodiment exclusively from a group comprising at least one third polyisobutylene, preferred exactly one third polyisobutylene. In an alternative embodiment, said at least one third compound can be selected from a group comprising at least one third butyl rubber, preferred exactly one third butyl rubber. In a further alternative embodiment it may also be provided that said at least one third compound is selected from a group comprising at least one third polyisobutylene and at least one third butyl rubber. As far as a mixture of one at least one third polyisobutylene and at least one third butyl rubber is provided, said at least one third polyisobutylene and said at least one third butyl rubber can be comprised by the composition in about the same quantity. It may however also be provided that varying quantities of said at least one third polyisobutylene and said at least one third butyl rubber are comprised in it.

Especially preferred, the anti-corrosion composition comprises exactly one first compound, exactly one second compound and exactly one third compound. Especially preferred, the composition according to the invention comprises as a first compound exactly one first polyisobutylene or exactly one first depolymerized butyl rubber, as a second compound exactly one second polyisobutylene or exactly one second partly cross-linked butyl rubber, and as a third compound exactly one third polyisobutylene or exactly one third butyl rubber. Especially preferred, the composition according to the invention comprises at least one first depolymerized butyl rubber, at least one second polyisobutylene and as a third compound either at least one third butyl rubber or at least one third polyisobutylene. Preferred, the anti-corrosion composition comprises exactly one first depolymerized butyl rubber, exactly one second polyisobutylene, and exactly either one third butyl rubber or a third polyisobutylene. Preferred, in case of the mentioned compositions, those butyl rubbers and polyisobutylenes are used, which further above were characterized as preferred or further preferred regarding their properties and quantities.

In an alternative embodiment, the anti-corrosion composition according to the invention comprises as a first compound at least one first polyisobutylene, at least one second partly cross-linked butyl rubber as a second compound, and as a third compound either at least one third butyl rubber or at least one third polyisobutylene. Preferred, the composition according to the invention comprises as a first compound exactly one first polyisobutylene, as a second compound exactly one second partly cross-linked butyl rubber, and as a third compound either exactly one third butyl rubber or a third polyisobutylene. The polyisobutylenes and butyl rubbers comprised in the aforementioned compounds are used with their preferred respectively further preferred properties and quantities, as characterized further above.

Preferred, the composition according to the invention comprises at least one first polyisobutylene in a quantity ranging from about 30% by weight to about 50% by weight, at least one second partly cross-linked butyl rubber in a quantity ranging from about 2% by weight to about 10% by weight, and a third polyisobutylene in a quantity ranging from about 12% by weight to about 30% by weight or a third butyl rubber in a quantity ranging from about 12% by weight to about 30% by weight, wherein the percent-by-weight quantities are each based on the total quantity of the composition according to the invention. In an alternative embodiment, the composition according to the invention comprises about 30% by weight to about 50% by weight of one first depolymerized butyl rubber, about 2% by weight to about 10% by weight of a second polyisobutylene, and about 12% by weight to about 30% by weight of at least one third polyisobutylene or about 12% by weight to about 30% by weight of at least one third butyl rubber, wherein the percent-by-weight quantities are each based on the total quantity of the composition according to the invention. In case of the aforementioned compositions, the polyisobutylenes and butyl rubbers used have the preferred or further preferred properties as characterized further above.

In a preferred embodiment, optionally in combination with one first, second and/or third butyl rubber as above defined, independently of each other the at least one first polyisobutylene has a Staudinger index $J_0$ ranging from about 15 cm$^3$/g to about 70 cm$^3$/g and an average relative molar mass $\overline{M}_V$ (viscosity agent) ranging from about 14,000 g/mole to about 147,000 g/mole;

the at least one second polyisobutylene has a Staudinger index $J_0$ ranging from about 240 cm$^3$/g to about 900 cm$^3$/g and an average relative molar mass $\overline{M}_V$ (viscosity agent) ranging from about 980,000 g/mole to about 7,493,000 g/mole; and the at least one third polyisobutylene has a Staudinger index $J_0$ ranging from about 75 cm$^3$/g to about 235 cm$^3$/g and an average relative molar mass $\overline{M}_V$ (viscosity agent) ranging from about 164,000 g/mole to about 950,000 g/mole.

In a preferred embodiment, optionally in combination with one first, second and/or third butyl rubber as above defined, independently of each other the at least one first polyisobutylene has a Staudinger index $J_0$ ranging from about 24.9 cm$^3$/g to about 54.4 cm$^3$/g and an average relative molar mass $\overline{M}_V$ (viscosity agent) ranging from about 30,000 g/mole to about 100,000 g/mole;

the at least one second polyisobutylene has a Staudinger index $J_0$ ranging from about 227.0 cm$^3$/g to about 820.6 cm$^3$/g and an average relative molar mass $\overline{M}_V$ (viscosity agent) ranging from about 900,000 g/mole to about 6,500,000 g/mole; and the at least one third polyisobutylene has a Staudinger index $J_0$ ranging from about 70.8 cm$^3$/g to about 218.7 cm$^3$/g and an average relative molar mass $\overline{M}_V$ (viscosity agent) ranging from about 150,000 g/mole to about 850,000 g/mole.

In a further preferred embodiment, the anti-corrosion composition comprises at least one first compound selected from a group comprising at least one first polyisobutylene with an average relative molar mass $\overline{M}_V$ ranging from about 35,000 g/mole to about 90,000 g/mole and/or at least one first depolymerized butyl rubber with an apparent viscosity according to Brookfield at 66° C. according to DIN EN ISO 2555:2000-01 ranging from about 500,000 mPa·s to about 2,000,000 mPa·s, an average molecular weight $M_w$ ranging from about 30,000 to about 45,000 and a degree of unsaturation of 2.0 to 4.0 mole-%;

at least one second compound selected from a group comprising at least one second polyisobutylene with an average relative molar mass $\overline{M}_V$ ranging from about 1,000,000 g/mole to about 4,000,000 g/mole and/or at least one second, partly crosslinked butyl rubber with a Mooney viscosity ML(1+3) at 127° C. ranging from about 60 MU to about 90 MU according to ISO 289:2005 and a degree of unsaturation of below 1.0 mole-%; and optionally at least one third compound selected from a group comprising at least one third polyisobutylene with an average relative molar mass $\overline{M}_V$ ranging from about 200,000 g/mole to about 800,000 g/mole and/or at least one third butyl rubber with an average molecular weight $M_w$ ranging from about 150,000 to about 2,000,000, a Mooney viscosity ML(1+8) at 125° C. ranging from about 40 MU to about 60 MU, measured according to ISO 289:2005, and a degree of unsaturation of below 1.0 to 2.0 mole-%, wherein the anti-corrosion composition comprises at least one first or at least one second polyisobutylene as well as at least one first or at least one second butyl rubber.

In a further preferred embodiment, the anti-corrosion composition according to the invention comprises one first, second and third polyisobutylene, each having the above-mentioned values, preferably the mentioned preferred values, for the Staudinger index $J_0$ and the average relative molar mass $\overline{M}_V$ (viscosity agent), in particular exactly one first, exactly one second and exactly one third polyisobutylene, each of which having the above-mentioned values, preferably the mentioned preferred values, for the Staudinger index $J_0$ and the average relative molar mass $\overline{M}_V$ (viscosity agent).

Preferably, the composition according to the invention comprises besides said mentioned at least one first, at least one second and/or at least one third compounds, a filler material, at least one antioxidant, at least one cross-linking agent, at least an elastomer and/or at least one stabilizer. The above-mentioned further components can be added to the composition according to the invention separately or in mixtures. Especially preferred, the anti-corrosion composition according to the invention comprises besides said at least one first and at least one second compound, further preferred also besides the at least one third compound, at least one filler material. Said at least one filler material is preferably comprised by the composition in a quantity ranging from about 20% by weight to about 70% by weight, further preferred in a quantity ranging from about 30% by weight to about 65% by weight, and even further preferred in a quantity ranging from about 33% by weight to about 50% by weight, each based on the total quantity of it. Especially preferred, said at least one filler material is powdery or fibrous. The term fibrous in the sense of the present invention also includes such filler materials having a needle-shaped structure. Especially preferred, the composition according to the invention comprises at least one first powdery filler material and at least one second fibrous filler material. Especially preferred in case of adding such a mixture of at least one powdery and at least one fibrous filler material, said fibrous filler material is added at a quantity up to a maximum of the quantity of the powdery filler material. A powdery as well as a fibrous filler material can each be comprised by said composition in a quantity ranging from about 10% by weight to about 40% by weight, preferred in a quantity ranging from about 12% by weight to about 25% by weight, each based on the total quantity of said composition.

Preferred, said at least one filler material is selected from a group of the powdery mineral filler materials or of the mineral and/or organic fibrous filler materials. It may for example be of metal, zinc oxide, cellulose fibers, of needle-shaped wollastonite or the like. It may also be selected from a group of organic fibers as for example from acrylonitrile fibers with a length ranging from about 1.5 mm to about 20 mm, further preferred with a length of about 4 mm to about 15 mm, and a fineness ranging from about 0.5 dtex to about 100 dtex, further preferred with a fineness ranging from about 1 dtex to about 20 dtex, each measured according to ISO 1144 in the version of 1973. As far as a powdery filler material, in particular a mineral powdery filler material is used, it preferably has a residue in % at a sieve analysis according to DIN 66165 in the version 1987-04 at H-100 (100 µm) from about 1% to about 5%, at H-60 (60 µm) from about 1% to about 5% and at H-30 (30 µm) ranging from about 1% to about 5%. Preferably, the anti-corrosion composition comprises at least one filler material. If the filler material is powdery, it is preferably selected from the group of mineral filler materials and preferably is a talcum.

As far as at least one antioxidant is provided, this can be comprised by the anti-corrosion composition according to the invention preferably in a mixture of various antioxidants in a quantity ranging from about 0.1% by weight to about 1% by weight, further preferred in a quantity ranging from about 0.15 to about 0.5% by weight, each based on the total quantity of it. As far as at least one stabilizer, which may also be referred to as a dispersing agent, is contained in the anti-corrosion composition according to the invention, this is preferably selected from a group comprising $C_{10}$- to $C_{24}$-carbonic acid, and is preferably a stearic acid. Said at least one stabilizer is comprised by the anti-corrosion composition according to the invention preferred in a quantity ranging from about 0.05% by weight to about 0.5% by weight, based on the total quantity of said composition. As stabilizers, for example metal salts of the mentioned carbonic acids, for example zinc stearates or free carboxylic acids, as for example free fatty acids with 12 to 24 carbon atoms, in particular stearic acid or oleic acid, may also be used.

Furthermore, the composition according to the invention can comprise other additives, which may be usually required depending on the operational purpose. In particular, the anti-corrosion composition can further comprise at least one flame retardant, at least one cross-linking agent and/or at least an elastomer. As far as a flame retardant is provided, it is comprised by the anti-corrosion composition according to the invention preferably in a quantity ranging from about 0.02% by weight to about 2% by weight, based on the total quantity of said composition.

As far as the anti-corrosion composition according to the invention comprises at least one cross-linking agent, it is comprised by the anti-corrosion composition according to the invention preferably in a quantity ranging from about 0.1% by weight to about 10% by weight, further preferred in a quantity ranging from 0.2% by weight to about 8% by weight, each based on the total quantity of said composition. The cross-linking agent is comprised in particular, if the anti-corrosion composition is a component of a single- or multi-layered tape, especially a wrapping tape for pipes of each kind, in particular pipelines. However, it may also be comprised, in case the anti-corrosion composition is provided as a coating or spattling compound. Said at least one cross-linking agent is preferably selected from a group comprising at least one phenolic resin. Phenolic resins are rehardened by cross-linking reactions to become thermosetting plastics, the so-called phenoplasts. Such cross-linking reaction can occur in the anti-corrosion composition according to the invention, especially if it comprises at least one first depolymerized or at least one second, at least partly cross-linked or even at least one third butyl rubber or at least one partly unsaturated polyisobutylene, as described further below. Phenolic resins are condensation products of a phenol with aldehydes, preferably with formaldehyde. In the sense of the present invention, the anti-corrosion composition according to the invention comprises at least one phenolic resin containing hydroxymethyl groups. These hydroxymethyl groups constitute the reactive respectively functional groups which trigger a cross-linking reaction which may also be referred to as self-hardening reaction, with said functional groups, i.e. said carbon-carbon double bonds of said at least one first depolymerized, said at least one second partly cross-linked and/or said at least one third butyl rubber, or partly unsaturated polyisobutylenes. Especially preferred in the sense of the present invention is the at least one phenolic resin produced from at least one phenol or its derivatives and of at least one aldehyde, selected from a group comprising formaldehyde, acetaldehyde, benzaldehyde and/or acrolein, wherein the formaldehyde is especially preferred. As phenol derivatives particularly tetrabutylphenol, nonylphenol or octylphenol are used, but also aryl derivatives, especially phenylphenol, as well as divalent phenols as for example resorcinol or bisphenol A or naphthol can be used. Especially preferred are octylphenol-formaldehyde resins. Phenol resins as a cross-linking agent are in particular such being in the class of the so-called resoles, i.e. which are produced via a base-catalyzed reaction of the mentioned starting products.

Upon wrapping an at least two-layered tape having as outer layer at least one layer of the anti-corrosion composition according to the invention, in overlap areas said at least one layer of the anti-corrosion composition according to the invention gets into touch with a further layer. This further layer, e.g. a coupling layer, can in this case advantageously comprise catalytic converters, which accelerate the cross-linking reaction, especially at low temperatures, for example at a room temperature of 23° C. Suitable catalytic converters are selected from a group comprising at least one zinc chloride, zinc bromide, ferric chloride, antimony chloride, antimony bromide, tin bromide, germanium chloride, cobalt bromide, nickel chloride and/or organic salts of tin or zinc, as for example zinc stearates or zinc oleates, wherein particularly preferred, tin or zinc halides, and further preferred, tin chloride and zinc chloride, solely or as a mixture, can be used. Said catalytic converter is comprised in this further layer of a tape, which does preferably not contain the anti-corrosion composition, preferably in a quantity ranging from about 0.1% by weight to about 5% by weight, further preferred in a quantity ranging from about 0.15% by weight to about 4.5% by weight, and even further preferred in a quantity ranging from about 0.2% by weight to about 4% by weight, each based on the total quantity of said further layer.

If a catalytic converter is provided, the material comprising it can preferably contain at least one co-reagent, selected from a group comprising divinyl fumarate, divinyl adipate and triallyl-trichlorbenzol, wherein especially preferred a triallyl-trichlorbenzol is selected. The co-reagent in particular serves to make the used catalyst converter acceptable for the material containing the catalyst converter. Preferably, the co-reagent is comprised in the material containing the catalyst converter in a quantity ranging from about 0.5% by weight to about 5% by weight, further preferred in a quantity ranging from about 2% by weight to about 4.5% by weight, based on the total quantity of said material containing the catalyst converter.

Said at least one elastomer is preferably selected from a group comprising at least an ethylene-propylene-diene-rubber. Especially such co- or block-co-polymers as well as terpolymers are meant here, which have a carbon-carbon double bond as functional groups. Hereof it is also possible to use mixtures. Especially preferred are terpolymers being formed in a polymerisation reaction with ethylene, propylene and one diene. They are also called EPDM terpolymers and combine one saturated polymer backbone with unsaturated rests in side groups. Especially preferred in the sense of the present invention in this case 5-ethylidene-2-norbornens, dicyclopentadien and/or 5-vinylidene-2-norbornes as a diene are used in quantities up to about 15% by weight, preferred in quantities ranging from about 0.3% by weight to about 12% by weight. In case of using 5 ethyliden-2-norbornes, preferably quantities ranging from about 4% by weight to about 11% by weight and in case of using dicyclopentadien, quantities ranging from about 1.0% by weight to about 6.0% by weight are used. The above-mentioned percent-by-weight quantities are based on the total quantity of monomers being used in a polymerization to an EPDM respectively ethylene-propylene-rubber.

An especially preferred anti-corrosion composition according to the invention comprises about 30% by weight to about 50% by weight of said at least first compound, about 2% by weight to about 10% by weight of said at least one second compound, about 12% by weight to about 30% by weight of said at least one third compound, and about 25% by weight to about 45% by weight of at least one filler material, wherein the quantities are each based on the total quantity of the anti-corrosion composition according to the invention.

In an especially preferred embodiment, the anti-corrosion composition according to the invention comprises about 35% by weight to about 45% by weight of exactly one first polyisobutylene, about 3% by weight to about 7% by weight of exactly one second partly cross-linked butyl rubber, about 15% by weight to about 25% by weight of exactly one third polyisobutylene and about 30% by weight to about 40% by weight of two filler materials, wherein one filler material is a mineral powdery filler material and the other filler material is a mineral needle-shaped filler material. In a further preferred embodiment, the anti-corrosion composition according to the invention comprises about 35% by weight to about 45% by weight of exactly one first depolymerized butyl rubber, about 3% by weight to about 7% by weight of exactly one second polyisobutylene, about 15% by weight to about 25% by weight of exactly one third polyisobutylene or of one third butyl rubber, and about 40% by weight to about 45% by weight of a filler material, selected from a group of mineral powdery filler materials.

In the aforementioned preferred and especially preferred compositions of the anti-corrosion composition according to the invention furthermore, if required, about 0.1% by weight to about 0.5% by weight of at least one stabilizer and/or 0.15% by weight to about 0.6% by weight of at least one antioxidant can be comprised by the composition according to the invention, each based on the total quantity of it.

As far as in the present invention the term "about" is used for values, value ranges or terms containing values, those values are to be meant which are regarded as professionally usual in this context by a person skilled in the art. In particular comprised by the term "about" are deviations of the mentioned values, value ranges or terms containing values of +−10%, preferred +−5%, further preferred +−2%.

The anti-corrosion composition may further comprise at least one tackifier, in particular a hydrocarbon resin, in a quantity ranging from about 5% by weight to about 25% by weight, further preferred in a quantity ranging from about 8% by weight to about 20% by weight, each based on the total quantity of the anti-corrosion composition according to the invention.

Especially preferred, the anti-corrosion composition is provided in a tape or pad format. Especially preferred is the tape format.

Especially preferred, the tape is formed at least single-layered, further preferred, it is formed at least two-layered, but may also be formed three, four, five or multi-layered. It can for example be formed in a way that it has two outer layers comprising the anti-corrosion composition according to the invention, which encompass an inner layer formed of a carrier foil which is in particular made of at least a polyethylene and/or polypropylene, preferred of a polyethylene. The carrier foil which can have the effect of an anti-jackknife brake, depending on its thickness, may in this case have a coupling layer on one or both sides of it, facing the layers of the anti-corrosion composition according to the invention.

It may also be provided that the tape has only one single layer made of the anti-corrosion composition according to the invention, which is bonded with a carrier foil, in particular with such as above defined, wherein the carrier foil may have a coupling layer on one or both sides. In case of this construction, the carrier foil, serving primarily to stabilize the layer made of the anti-corrosion composition according to the invention, has a certain thickness, preferably ranging from about 0.2 mm to about 1.2 mm, further preferred from about 0.3 mm to about 0.7 mm. Further preferred, the carrier foil has coupling layers on both of its outer surfaces of the same or different compositions. The carrier foil may preferably have a coupling layer on its side facing the layer formed of the anti-corrosion composition according to the invention, which is formed of the same material as the carrier foil and of said at least one second and/or at least one third polyisobutylene and/or the at least one second partly cross-linked and/or an at least one third butyl rubber of the layer made of the anti-corrosion composition according to the invention, preferred exclusively of said aforementioned materials. The further coupling layer being applied to the side of the carrier foil not facing the layer made of the anti-corrosion composition, can however, especially if an at least one-layered second tape is provided in particular for mechanical protection, which can be wrapped around the tape comprising the anti-corrosion composition according to the invention on the respective product, of besides at least one second and/or at least one third polyisobutylene and/or said at least one second partly cross-linked and/or an at least one third butyl rubber according to the inventive composition and of the material of the carrier foil, in particular a polyethylene and/or polypropylene, and may comprise tackifiers, especially in the form of hydrocarbon resins as well as antioxidants and in particular the catalytic converters and/or co-reagents for those. The catalytic converter and/or co-reagent can in this case especially at higher temperatures, in particular such from about 50° C., preferred such ranging from about 55° C. to about 220° C., further preferred ranging from about 60° C. to about 140° C., initiate the cross-linking reaction in said at least one second partly cross-linked and/or at least one third butyl rubber, and, if appropriate, also in the further available elastomer, as above described. The catalytic converter, separately or in a mixture, is comprised in the outer coupling layer preferably in a quantity ranging from about 0.1% by weight to about 10% by weight, preferred ranging from about 0.15% by weight to about 4% by weight, each based on the total quantity of the outer coupling layer. Upon wrapping or applying the tape with at least one layer made of the anti-corrosion composition according to the invention onto tubular or other articles having an overlap, a cross-linking can be initiated in the overlap area, preferably at raised temperatures, if at least one catalytic converter is provided in the outer coupling layer, by which a stronger bonding, particularly without wrinkle formation can be achieved in the overlap area.

Said tape comprising the anti-corrosion composition according to the invention can be constructed particularly in a symmetrical, but also in an asymmetrical form. A symmetrically formed tape has, as above already described, a carrier foil comprising for example at least one polyethylene and/or polypropylene, being on its two outer surfaces each encompassed by one layer made of the anti-corrosion composition. The two outer layers do preferably have approximately the same thickness. In this case, between the carrier foil and the layers comprising the anti-corrosion composition at least one coupling layer may be provided, as above also described. If the coupling layer is applied on both sides of the carrier foil, it also has approximately the same strength. In this case this is referred to as a symmetrically constructed 3- respectively 5-layered respectively 5-sheet-tape, the coupling layers in the last-mentioned case included.

An asymmetrically constructed tape may also be provided. This can for example be constructed in a way that one layer being made of the anti-corrosion composition according to the invention and facing the product to be covered, is bonded with a carrier foil as above defined. In this case, at least one coupling layer can be applied between the layer comprising the anti-corrosion composition according to the invention and said carrier foil. On the side of said carrier foil not facing the layer made of the anti-corrosion composition according to the invention, for example another layer made of the anti-corrosion composition according to the invention may be provided, which has a lower thickness than the layer facing the article to be wrapped. Said carrier foil on the side not facing said layer made of the anti-corrosion composition according to the invention can also have a further coupling layer, which preferably also comprises at least one first and/or at least one third polyisobutylene and/or at least one second, partly cross-linked and/or at least one third butyl rubber as well as the material of the carrier foil, and further preferred in addition tackifiers like hydrocarbon resins, catalytic converters, co-reagents and other additives, as above already described.

In the sense of the present invention it may also be provided that said tape having a layer made of the anti-corrosion composition according to the invention comprises at least one layer of an anti-jackknife brake. In this case, said tape may for example be formed in a way that it comprises one single layer made of the anti-corrosion composition according to the invention, wherein approximately in the center, a very thin intermediate layer, preferred of a strength ranging from about 15 μm to about 100 μm, further preferred ranging from about 20 μm to about 75 μm, is applied. Said intermediate layer serves as an anti-jackknife brake and prevents the tape from overstretching, particularly in case of a spiral wrapping of the same around an article to be wrapped as for example a pipeline. Especially preferred, said anti-jackknife brake respectively said intermediate layer is formed of at least one polyethylene and/or polypropylene and is especially preferred a polyethylene foil, in particular made of an LDPE or LLDPE. A layer made of the anti-corrosion composition provided with such an anti-jackknife brake can also be referred to as two- or alternatively as three-layered. In this case, said anti-jackknife brake may be arranged in the tape symmetrically approximately in the center, but also asymmetrically shifted to the top or bottom side of it. However, preferred is a symmetrical arrangement approximately in the center, i.e. at half of the strength of the tape, as far as it comprises only one more layer made of the anti-corrosion composition according to the invention. As already described above, it may however also be provided that on top of said anti-jackknife brake on the side of the tape not facing the product to be wrapped, a further layer is applied which comprises for example a catalytic converter, for example an adhesive layer. In this case, a real three-layered tape is provided.

The aforementioned coupling layers preferably comprise the at least one second and/or at least one third polyisobutylene and/or the at least one second partly cross-linked and/or at least one third butyl rubber of the anti-corrosion composition according to the invention and at least one polyethylene and/or polyprobylene. Especially preferred, these comprise, preferred besides at least one second partly cross-linked and/or at least one third buty rubber, at least one second or at least one third polyisobutylene, preferred at least one third polyisobutylene, even further preferred exactly one third polyisobutylene or a mixture of a second and third polyisobutylene, wherein the quantities of the used at least one second and/or third polyisobutylene is in a range from about 35% by weight to about 65% by weight, further preferred in a range from about 40% by weight to about 60% by weight, each based on the total quantity of the coupling layer. In an alternative embodiment, the aforementioned coupling layers comprise at least one second partly cross-linked and/or at least one third butyl rubber, preferred at least one second or at least one third butyl rubber, even further preferred exactly one second or one third butyl rubber or a mixture of a second and a third butyl rubber, wherein the quantity of the used at least one second and/or third butyl rubber is in a range from about 35% by weight to about 65% by weight, further preferred in a range from about 40% by weight to about 62% by weight, each based on the total quantity of the coupling layer. Said at least one polyethylene and/or polypropylene, preferably at least one polyethylene, in particular one LPDE or LLDPE, further preferred exactly one polyethylene, is comprised by the coupling layer in a quantity ranging from about 25% by weight to about 65% by weight, further preferred ranging from about 30% by weight to about 60% by weight, each based on the total quantity of the coupling layer. A composition of a coupling layer exclusively comprises the at least one second and/or at least one third butyl rubber and the at least one polyethylene and/or polypropylene, preferred exactly one second or one third butyl rubber and exactly one polyethylene, but no further additives.

A further composition of a coupling layer comprises besides said at least one second and/or at least one third polyisobutylene and or the at least one second and/or at least one third butyl rubber and the at least one polyethylene and/or polypropylene further additives, namely preferably tackifiers, antioxidants, catalytic converters, co-reagents, as in particular above described, as well as color pigments. In this case, for example a tackifier in a quantity ranging from about 5% by weight to about 15% by weight, further preferred in a quantity ranging from about 7% by weight to about 13% by weight can be provided being preferably selected from a group comprising hydrocarbon resins. Moreover, at least one antioxidant may be provided, preferably in a quantity ranging from about 0.05% by weight to about 0.5% by weight, further preferred in a quantity ranging from about 0.1% by weight to about 0.5% by weight. Said antioxidant can in this case particularly be selected from a group comprising sterically hindered phenols, as for example pentaerythritol-tetrakis (3-(3.5-di-ter-butyl-4-hydroxyphenyl)propionate). Furthermore, said coupling layer can also comprise at least one pigment, in particular such having the form of a masterbatch. Said at least one pigment is provided in a composition of the coupling layer in a quantity ranging from about 0.5% by weight to about 3% by weight, further preferred in a quantity ranging from about 0.9% by weight to about 2% by weight. The aforementioned quantities given in percent by weight for said tackifier, said antioxidant and said pigment each refer to the total quantity of the coupling layer. Said pigment can for example be a black pigment, in order to convey a uniform appearance of the tape. However, each other pigment as for example a red one can also be used to highlight and to mark the presence of a coupling layer. the coupling layer has preferably a strength ranging from about 10 µm to about 150 µm, further preferred a strength ranging from about 20 µm to about 100 µm, even further preferred a strength ranging from about 25 µm to about 80 µm.

Said carrier foil, as far as it is not formed as a anti-jackknife brake, preferably has a thickness ranging from about 0.2 mm to about 1.2 mm, further preferred a thickness ranging from about 0.3 mm to about 0.8 mm. Said carrier foil is preferably made of polyethylene or polypropylene, and is preferred made of a polyethylene. Especially preferred, said carrier foil is formed from a group comprising polyethylenes, which can be electron-beam crosslinked. If said carrier foil is used with coupling layers, said coupling layers also contain a polyethylene which can be electron-beam crosslinked, preferably the same polyethylene being contained in said carrier foil. Further preferably, said carrier foil has been slightly stretched, so that it advantageously has a tendency to shrink when being heated and thus, a possible length expansion upon heating can be overcompensated. Further, upon application by wrapping tubular articles, the contact pressure in direction of the tubular article is also increased.

If said carrier foil has a coupling layer on one or on both sides, the complete composite will preferably be slightly stretched. A composite foil produced in this way will followingly be coated with the anti-corrosion composition according to the invention on at least one side. This layer preferably has a thickness ranging from about 0.25 mm to about 2.0 mm, further preferred a thickness ranging from about 0.35 mm to about 1.3 mm. If said carrier foil is coated with a coupling layer on both sides and if said carrier foil is coated with the anti-corrosion composition only on one side, the outer coupling layer preferably comprises catalytic converters, if appropriate also co-reagents for them, as above described. The composition of the adhesion layers applied on both sides of said carrier foil can thus be different, especially preferred in the sense of the present invention. The above described tape construction has the advantage that on the one hand a cross-linking reaction is also initiated in the overlap area upon wrapping or applying such a tape via the provided catalytic converter, as far as in particular the at least one second and/or the at least one third butyl rubber is contained, and, no matter whether applied with overlap or not, said tape can be wrapped for example with an identical further tape, wherein said at least one catalytic converter contained in said outer coupling layer initiates the cross-linking of the part of the further tape comprising the anti-corrosion composition according to the invention facing said tape. Said carrier foil can comprise further additives as for example pigments, antioxidants or stabilizers/disperging agents. In a further embodiment of the present invention, the anti-corrosion composition according to the invention can also be applied on one side of a shrink sleeve or a shrink tape. In addition to providing a good adhesion by cross-linking as a result of the specific composition of the anti-corrosion composition according to the invention, due to the heating of the shrink sleeve respectively the shrink tape required for the shrinking, a further thermal activation of the anti-corrosion composition according to the invention can be provided, so that the cross-linking reaction is supported which causes an even stronger bonding of such system in particular to a tubular article.

In addition to said aforementioned at least single-layered tape comprising the anti-corrosion composition according to the invention, a second tape may be provided for giving mechanical protection. Said second tape is constructed at least single-layered, and is preferably constructed in a single-, two- or three-layered form. However, it may also be constructed in a four- or even multiple-layered form. The second tape is meant to be a mechanical protection tape. Said second tape comprises preferably a layer made of at least one polyethylene and/or polypropylene, preferred at least one polyethylene, preferred an electron-beam-cross-linked polyethylene of sufficient strength. As far as polyethylene is used, it preferably comprises an ultimate elongation according to EN ISO 527 in the version of 2012-06 of >300%, further preferred >400%, even further preferred >500%, preferred such ranging from about 300% to about 800%. Further preferred, it has a tensile strength according to EN ISO 527 in the version of 2012-06 ranging from about 8 MPa to about 25 MPa, further preferred ranging from about 12 to about 20 MPa. The second tape can for example also be used to wrap two identical tapes comprising the anti-corrosion composition according to the invention around a tubular article. The identity of the aforementioned tapes with the anti-corrosion composition advantageously consists in an identical construction and/or identical chemical composition.

Said at least one layer made of polyethylene and/or polypropylene, preferably exactly one layer, of the second tape can be provided with an adhesive layer on one side. However, it may also be provided that it is formed on one side with an adhesive layer of at least one first and/or at least one third butyl rubber or at least one first polyisobutylene and/or at least one third polyisobutylene according to the anti-corrosion composition of the invention. However, this layer can comprise even further additives. As far as one adhesive layer is bonded with said layer of at least one polyethylene and/or polypropylene, as described above, for the second tape it is in this case preferably provided that between these two layers a layer for achieving a sufficient coupling is provided, wherein this can have a composition as described further above in connection with a tape comprising the anti-corrosion composition according to the invention.

Moreover, a pipe protection pad can furthermore be provided which is wrapped around said at least one tape with at least one layer made of the anti-corrosion composition according to the invention, if appropriate even in combination with a second tape, which serves as a cover and protection tape, providing an advantageous, in particular load-distributing effect on the wrapping with said at least one tape arranged underneath the pipe protection pad.

Each product subject to possible corrosion can be protected with the anti-corrosion composition according to the invention, in particular by covering if applied as a tape or pad (foil) or if applied by grouting or spackling the mass in order to form a coating. Especially preferred, the anti-corrosion composition is used for pipes and systems comprising pipes. In particular, the anti-corrosion composition is used for wrapping pipelines of each kind, but also for wrapping gas pipelines etc. It can also be used for other technical plants and/or in areas being subject to possible corrosion, and this not only as a wrapping, but also for example as a support/cover, the aforementioned in case of providing it as an at least single-layered tape or at least single-layered pad, but also as a coating made of a mixture of the anti-corrosion composition according to the invention, which can be grouted or spackled.

The present invention further relates to the use of the anti-corrosion composition according to the invention as described further above for protecting pipes and systems comprising pipes as well as other plants and installations from corrosion. Furthermore, the present invention also relates to a method for achieving anti-corrosion on pipes and systems comprising pipes as well as other plants and installations by applying the anti-corrosion composition according to the invention. Especially preferably according to the invention, an at least single-layered tape comprising the anti-corrosion composition according to the invention is wrapped around pipes respectively systems comprising pipes. And finally, the present invention relates to at least one single-layered wrapping tape comprising the anti-corrosion composition according to the invention, as above described.

The present invention is explained in more detail based on the following examples. Here, it should be mentioned in advance that the features indicated in the examples may be combined with each single or with each other of all features described in the general description. In particular, the composition of the anti-corrosion composition according to the invention in tape format is just an example.

In total, six comparative compositions 1 to 6 and four anti-corrosion compositions according to the invention 7 to 10 were prepared, wherein their composition can be taken from the following table, which also indicates the peel strengths/peel resistances, defined according to DIN EN 12068 in the version 1999-03. All numerical values in the following table are—unless indicated otherwise—indicated in weight percent (% by weight), each value being based on the total quantity of each of the compositions 1 to 10.

|  | Composition No. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| First polyisobutylene | 30 | 39.1 | 32.5 | 33 | 30 | 40 | 40 |  |  | 40 |
| First depolymerized butyl rubber |  |  |  |  |  |  |  | 39.5 | 37 |  |

-continued

| | Composition No. | | | | | | | | | |
|---|---|---|---|---|---|---|---|---|---|---|
| | 1 | 2 | 3 | 4 | 5 | 6 | 7 | 8 | 9 | 10 |
| Third polyisobutylene | | | | | | 20 | 20 | 21 | 20 | 15 |
| Second polyisobutylene | | | | | | 5 | | 3 | 8.5 | |
| Second partly pre-crosslinked butyl rubber | | | | | | | 5 | | | 10 |
| Third butyl rubber | 10 | 17.4 | 9.5 | 10 | 10 | | | | | |
| Powdery, mineral filler material | 60 | 34.8 | 57 | 57 | 60 | 18.7 | 18.7 | 36 | 34 | 18.7 |
| Tackifier | | 8.7 | | | | | | | | |
| Fibrous, mineral filler material | | | | | | 16 | 16 | | | 16 |
| Antioxidant | | | | | | 0.2 | 0.2 | 0.4 | 0.4 | 0.2 |
| Stabilizer | | | | | | 0.1 | 0.1 | 0.1 | 0.1 | 0.1 |
| Peel strength/peel resistance [N/cm] | 3.4 | 3.1 | 2.1 | 2.6 | 3.5 | 8.9 | 13.1 | 13.6 | 31 | 15.4 |

Said first polyisobutylene used in compositions 1 to 7 is always identical and corresponded to said especially preferred first polyisobutylene as defined further above. Said third polyisobutylene used in compositions 6 and 7 corresponded to said especially preferred third polyisobutylene as described further above. Said third butyl rubber used only in the comparative compositions 1 to 5 had an average molecular weight $M_w$ between 250,000 and 550,000. Said second polyisobutylene used in the composition 6 corresponded to such as further above defined as especially preferred. Said second pre-crosslinked butyl rubber used in composition 7 corresponded to said second partly cross-linked butyl rubber defined further above in the description as especially preferred. Said first depolymerized butyl rubber used in the inventive compositions 8 and 9 corresponded to said first depolymerized butyl rubber defined further above in the description as especially preferred. As a powdery, mineral filler material a talcum was used, which presents a natural mixture of magnesium silicate hydrate and magnesium aluminium silicate hydrate in a distinct platelet structure. As a fibrous mineral filler material, a wollastonit with a distinct needle structure was used. As a stabilizer, a stearic acid was used, the used antioxidant corresponded to usually marketable antioxidants.

In compositions 1 to 7 and 10, the average relative molar mass $\overline{M}_V$ (viscosity agent) was 42,000 g/mole for the first polyisobutylene used;

6, 8 and 9, the average relative molar mass $\overline{M}_V$ (viscosity agent) was 2,600,000 g/mole for the second polyisobutylene used; and 6 to 10, the average relative molar mass $\overline{M}_V$ (viscosity agent) was 390,000 g/mole for the third polyisobutylene used.

For the first butyl rubber used in compositions 8 and 9, the average molecular weight $M_w$ was 36,000, the viscosity according to Brookfield at 66° C. according to DIN EN ISO 2555:2000-01 was 1,000,000 mPa·s and the degree of unsaturation was 3.0 mole-%.

For the second butyl rubber used in compositions 7 and 10, the Mooney viscosity ML(1+3) at 127° C. was in a range from 80 MU to 90 MU according to ISO 289:2005 and the degree of unsaturation was below 1.0 mole-%.

For the third butyl rubber used in compositions 1 and 5, the Mooney viscosity ML(1+8) at 125° C. was in a range from 45 MU to 50 MU according to ISO 289:2005 and the degree of unsaturation was at 1.5 mole-%.

The anti-corrosion compositions 1 to 10 according to the above table were produced in the form of a three-layered tape with one layer made of the mentioned compositions on a carrier foil of polyethylene, having a coupling layer on its side facing said composition. With this three-layered tape, a steel pipe was wrapped at a room temperature of 23° C. without overlapping. Under these conditions upon determining the peel strength/peel resistance the values as indicated in the above table occurred. This shows that the compositions according to the invention, 7 to 10, have significantly higher values as to the peel strength/peel resistance than the compositions not corresponding to the invention, 1 to 6. The compositions 7 to 10 even achieved very good cohesive separating images and a very good wetting of the steel.

The tests carried out show that advantageous values regarding peel strength/peel resistance defined according to DIN 12068 in the version 1999-03 can be achieved with the Anti-corrosion composition according to the invention, and even very good cohesive separating images can be generated. Also, a good wetting of the substrate is achieved, especially of a steel pipe. No pre-coatings respectively primers or adhesive agents were used. These are not necessarily required in order to fulfil the standard according to DIN EN 12068 in the version 1999-03.

Omitting primers or adhesive agents, which is possible according to the invention, bears the advantage that less effort has to be taken for applying the anti-corrosion composition. Further advantageous is that omitting the use of primers or adhesive agent, in particular such containing petrol as solvent, improves environmental protection. Moreover, transporting the anti-corrosion composition becomes easier, as primers or adhesive agents containing petrol as a solvent are for safety reasons not necessarily allowed to be transported in aircrafts.

Preferred is therefore using the anti-corrosion composition according to the invention for the protection of pipes, systems comprising pipes as well as other plants and/or installations from corrosion, without applying primers or adhesive agents, in particular such comprising petrol as a solvent.

Also preferred is a method for obtaining corrosion protection on pipes, systems comprising pipes as well as other plants and/or installations by applying the anti-corrosion composition according to the invention, which does not comprise the use of primers or adhesive agents, especially not such comprising petrol as a solvent.

The present invention provides a anti-corrosion composition which can be applied by grouting or by spackling as well as in the form of a tape or shrink sleeve or in any other embodiment, and which has very good adhesion properties and thus provides durable corrosion protection to the products, systems, installations, pipes, pipelines etc. to which it is applied. Advantageously, it can, in whichever form, be used without a primer/adhesive agent.

The invention claimed is:

1. An anti-corrosion composition comprising:
   a first compound selected from the group consisting of a first polyisobutylene having an average relative molar mass $\overline{M}_V$ ranging from about 30,000 g/mole to about 100,000 g/mole and a Staudinger index $J_0$ ranging from about 15 cm$^3$/g to about 70 cm$^3$/g, a first depolymerized butyl rubber with an apparent Brookfield viscosity at 66° C. according to DIN EN ISO 2555:2000-01 ranging from about 400,000 mPa·s to about 2,000,000 mPa·s and an average molecular weight $M_w$ ranging from about 20,000 to about 60,000, and combinations thereof;
   a second compound, selected from the group consisting of a second polyisobutylene having an average relative molar mass $\overline{M}_V$ ranging from about 900,000 g/mole to about 6,500,000 g/mole and a Staudinger index $J_0$ ranging from about 240 cm$^3$/g to about 900 cm$^3$/g, at least one second partly cross-linked butyl rubber with a Mooney viscosity ML(1+3) at 127° C. ranging from about 65 MU to about 100 MU according to ISO 289:2005, and combinations thereof;
   wherein the anti-corrosion composition comprises at least one first or at least one second polyisobutylene as well as at least one first or at least one second butyl rubber.

2. An anti-corrosion composition according to claim 1, wherein the first compound is present in an amount from about 20% by weight to about 66% by weight, based on the total weight of the anti-corrosion composition.

3. An anti-corrosion composition according to claim 1, wherein the second compound is present in an amount from about 1% by weight to about 20% by weight, based on the total weight of the anti-corrosion composition.

4. An anti-corrosion composition according to claim 1, further including at least a third compound, selected from the group consisting of a third polyisobutylene with a Staudinger index $J_0$ ranging from about 75 cm$^3$/g to about 235 cm$^3$/g and an average relative molar mass $\overline{M}_V$ ranging from about 150,000 g/mole to about 85,000 g/mole, a third butyl rubber with an average molecular weight $M_w$ ranging from about 150,000 to about 2,000,000 and a Mooney viscosity ML(1+8) at 125° C. ranging from about 20 MU to about 62 MU, measured according to ISO 289:2005, and combinations thereof.

5. An anti-corrosion composition according to claim 4, wherein the third compound is present in an amount from about 10% by weight to about 40% by weight, based on the total weight of the anti-corrosion composition.

6. An anti-corrosion composition according to claim 1 further including at least one filler material, at least one antioxidant, at least one cross-linking agent, at least an elastomer and/or at least one stabilizer.

7. An anti-corrosion composition according to claim 6, wherein the at least one filler material is present in an amount from about 20% by weight to about 70% by weight, based on the total weight of the anti-corrosion composition.

8. An anti-corrosion composition according to claim 6, wherein the at least one filler material is powdery or fibrous.

9. An anti-corrosion composition according to claim 8, including one first powdery filler material and one second fibrous filler material.

10. An anti-corrosion composition according to claim 1 wherein the anti-corrosion composition is provided in tape format or pad format.

11. An anti-corrosion composition according to claim 10, wherein the tape has a two or multi-layered structure, wherein at least one layer includes the anti-corrosion composition.

12. A method for the protection of products from corrosion using the anti-corrosion composition according to claim 1 including the steps of providing a structure to be protected and applying the composition according to claim 1.

13. Method according to claim 12, wherein the structure to be protected includes pipes that are wrapped with an at least single-layered tape including the anti-corrosion composition.

14. An at least single-layered wrapping tape comprising the composition according to claim 1.

* * * * *